United States Patent Office 2,757,180
Patented July 31, 1956

2,757,180

TRIS(TETRAHYDROFURFURYL) (1',2'-DICARBOXYETHYL) OCTADECENOATE

Joachim Dazzi, Dayton, Ohio, assignor to Monsanto Chemical Company, St. Louis, Mo., a corporation of Delaware No Drawing. Application May 25, 1950,
Serial No. 164,307

1 Claim. (Cl. 260—347.4)

This invention relates to heterocyclic derivatives of adducts formed by the addition reaction of $\alpha,\beta$-ethylenic acids or anhydrides with certain higher fatty acids, and to vinyl chloride polymers plasticized with such derivatives.

The preparation of adducts by reaction of an $\alpha,\beta$-ethylenic acid or anhydride with an unsaturated, non-conjugated, non-hydroxylated fatty acid containing from 10 to 24 carbon atoms in its carbon chain is described by Clocker in U. S. Patents Nos. 2,188,882 to 2,188,890 inclusive. The adducts are polybasic, acyclic, $\alpha,\beta$-ethylenic acids of not more than 6 carbon atoms combined at a carbon of the carbon atom chain of a non-conjugated, unsaturated, non-hydroxylated fatty acid having from 10 to 24 carbo natoms or an ester thereof. Suitable $\alpha,\beta$-ethylenic acids or anhydrides for use in the preparation of the adducts are maleic anhydride, maleic acid, fumaric acid, citraconic acid, citraconic anhydride, etc. Suitable fatty acids for use in the addition reaction with the above $\alpha,\beta$-ethylenic compounds for the preparation of the adducts include oleic acid, undecylenic acid, elaidic acid, linoleic acid, linolenic acid, etc. For the sake of brevity and convenience, the addition products obtained by reaction of an $\alpha,\beta$-ethylenic acid or anhydride with a non-conjugated, unsaturated, non-hydroxylated fatty acid or fatty acid ester will be hereinafter referred to as Clocker adducts.

I have found that highly valuable derivatives are obtained by reacting tetrahydrofurfuryl alcohol with the Clocker adducts. Thus, the adduct of maleic anhydride with a fatty acid or an ester thereof such as octadecenoic acid or an alkyl octadencenoate having the probable structure:

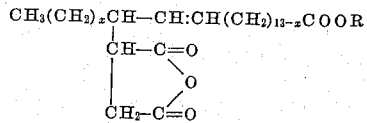

in which R is a member of the group consisting of hydrogen and alkyl groups of from 1 to 8 carbon atoms and $x$ is a whole number of from 5 to 8, is contacted with one of the present hydroxy furan compounds in the presence of an esterifying catalyst to yield the triester:

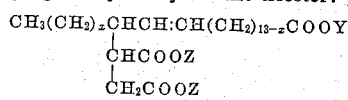

in which Z is a tetrahydrofurfuryl radical, $x$ is a whole number of from 5 to 8 carbon atoms, and Y is a member of the group consisting of Z and alkyl groups of from 1 to 8 carbon atoms. The esters of (1',2'-dicarboxyethyl)-octadecenoic acid represented by the above formula may be triesters with the tetrahydrofurfuryl alcohol, e. g., tris(tetrahydrofurfuryl) (1',2' - biscarboxymethyl)octadecenoate, or they may be mixed esters in which only the maleic group is esterified by the tetrahydrofurfuryl alcohol, e. g., n-butyl (1',2'-bis(carbotetrahydrofurfuryloxy)-actadecenoate. The mixed esters may be obtained by employing in the esterifying step an adduct of an $\alpha,\beta$-ethylenic acid of not more than six carbon atoms and an alkyl ester of a non-conjugated, unsaturated non-hydroxylated fatty acid. Because of uncertainty concerning the position at which the maleic residue is attached to the fatty acid, the present esters will be hereinafter referred to without specifically indicating the position of the (1',2'-dicarboxyethyl) group.

Esterifying catalysts of general utility in the preparation of the present esters are acidic or basic materials, for example, p-toluenesulfonic acid, sulfuric acid, pyrophosphoric acid, hydrochloric acid, sodium methylate, etc. Reaction of the Clocker adducts with the present tetrahydrofurfuryl alcohol occurs to some extent at ordinary room temperature; however, in order to obtain good yields it is preferred to heat the reaction mixture, advantageously at refluxing temperatures. Inasmuch as the esterification reaction involves the condensation of one mole of the Clocker adduct with from two to three moles of the hydroxy furan compound, depending upon whether the adduct is a free acid or a mono-ester, it is preferred to employ stoichiometric proportions of the reactants. However, since any excess of either the Clocker adduct or the hydroxy furan compound may be readily recovered from the final product, the quantity of reactants employed in the initial reaction mixture is immaterial. It is preferred, however, to use an excess of the hydroxy furan compound in order to minimize incomplete esterification.

The present esters of the Clocker adducts are stable, high boiling, viscous products which are very advantageously employed as plasticizers for polyvinyl chloride.

Adducts of acyclic olefinic acids and long-chained unsaturated acids have been hitherto generally suggested for use as softening agents. I have now found, however, that esters of Clocker adducts and tetrahydrofurfuryl alcohol are of outstanding value as plasticizers, these esters serving not only to soften vinyl chloride polymers, but also to impart simultaneously a high degree of low temperature flexibility, very good temperature stability and great mechanical strength to these polymers. While many of the esters encompassed by the Clocker patents referred to above are incompatible with polymers and copolymers of vinyl chloride and do not give continuous, homogeneous compositions, the present esters are compatible with vinyl chloride polymers and show no exudation of plasticizer even at plasticizer content of up to 50 per cent. Although the quantity of plasticizer will depend upon the particular polymer to be plasticized and upon its molecular weight, it is generally found that compositions having from 5 per cent to 50 per cent by weight of plasticizer will, in most cases, be satisfactory for general utility. The good flexibility of the plasticized compositions increases with increasing plasticizer concentration.

The present esters are valuable plasticizers for polyvinyl chloride and copolymers of at least 70 per cent by weight of vinyl chloride and up to 30 per cent by weight of an unsaturated monomer copolymerized therewith, for example, vinyl acetate, vinylidene chloride, etc.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from one to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized composition's usefulness as an elastomer.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized composition becomes stiff and hard. The test for plasticizer volatility herein employed is that described by the American Society for Testing Materials under the designation D-744-44T.

The invention is further illustrated, but not limited, by the following examples:

Example 1

This example shows the preparation of tris(tetrahydrofurfuryl) (1',2'-dicarboxyethyl)octadecenoate.

A mixture consisting of 120.0 g. of the oleic acid-maleic anhydride Clocker adduct and 204.6 g. of tetrahydrofurfuryl alcohol and 30 ml. of benzene was refluxed in a flask which was equipped with a condenser and a Dean-Stark water-trap for a time of 12 hours. During this period the pot temperature increased from 110° C. up to 240° C. At the end of this time esterification was not quite complete; accordingly, there was added to the reaction mixture 5 g. of p-toluenesulfonic acid as esterifying catalyst and 100 ml. of toluene as diluent. The resulting mixture was then heated for an additional 3.5 hours at a temperature of about 120° C. The product was then cooled, washed thoroughly with water, treated with 10 ml. of 10 per cent aqueous sodium hydroxide, and washed with water until neutral. Removal of the diluents from the product was then effected by heating at a temperature of 220° C./1 mm. of mercury pressure. The residue was the substantially pure tris(tetrahydrofurfuryl) (1',2'-biscarboxyethyl) octadecenoate, $$n_D^{25} = 1.4806$$

having a free acid content of 0.635 per cent.

Example 2

This example shows the preparation of tris(tetrahydrofurfuryl) (1',2'-dicarboxyethyl)undecylenate.

A mixture consisting of 70.6 g. (0.25 mole) of the 10-undecylenic acid-maleic anhydride adduct, 153.6 g. (1.5 moles) of tetrahydrofurfuryl alcohol, 3 g. of toluenesulfonic acid and 100 ml. of benzene was refluxed for a time of 7.5 hours. A Dean-Stark water-trap was employed, and during this time there was collected 8.0 ml. of water. The resulting product was then allowed to cool, washed neutral and then treated with 5 ml. of 10 per cent aqueous sodium hydroxide. The water layer was separated and the residue was dried at a temperature of 100° C./18 mm. of mercury pressure. Removal of the diluent and unreacted material from the dried residue by distillation at a temperature of up to 230° C./1.0 mm. of mercury pressure gave 100 g. (72.6 per cent yield) of the substantially pure tris(tetrahydrofuryl) (1',2'-dicarboxyethyl)undecylenate, $n_D^{25} = 1.4867$, testing 0.47 per cent free acid.

Example 3

Sixty parts of polyvinyl chloride and 40 parts by weight of the tris(tetrahydrofurfuryl) (1',2'-dicarboxyethyl)-octadecenoate are mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 14° C. which value denotes good low temperature properties. Tests on the volatility characteristics of the plasticized composition gave a value of 1.9 per cent which showed extremely good retention of plasticizer and indicated good temperature characteristics of the composition. The plasticized material had a hardness of 78 before the volatility test and a hardness of 81 after the volatility test. When subjected to heat at a temperature of 325° F. for a period of 30 minutes the clarity and color of the molded sheet were substantially unchanged.

Example 4

Operating as in Example 3, but employing tris(tetrahydrofurfuryl) (1',2'-dicarboxyethyl)undecylenate instead of the ester employed in Example 3, there was obtained a plasticized polyvinyl chloride composition having a low temperature flexibility value of minus 7° C. Tests on the volatility characteristics of the plasticized composition gave a value of 1.1 per cent, which value shows very good retention of the plasticizer. The plasticized material had a hardness of 77 before the volatility test and a hardness of 77 after the volatility test. When subjected to heat as in Example 3, the color of the present molded product was substantially unchanged.

While the above examples show only compositions in which the ratio of plasticizer to polymer content is 40:60, this ratio being employed in order to get comparable efficiencies, the content of ester to polyvinyl chloride may be widely varied, depending upon the properties desired in the final product. For many purposes a plasticizer content of, say, from only 10 per cent to 20 per cent is preferred. The present esters are compatible with polyvinyl chloride over wide ranges of concentrations, up to 50 per cent of esters based on the total weight of the plasticized composition yielding desirable products.

Although the invention has been described particularly with reference to the use of the present esters of Clocker adducts and tetrahydrofurfuryl alcohol as plasticizers for polyvinyl chloride, these esters are advantageously employed also as plasticizers for copolymers of vinyl chloride, for example, the copolymers of vinyl chloride with vinyl acetate or vinylidene chloride, etc. Preferably such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes it may be advantageous to use known stabilizers in the plasticized compositions. Inasmuch as the present esters are substantially unreactive with the commercially available heat and light stabilizers which are commonly employed with polyvinyl chloride or copolymers thereof, the presence of such materials in the plasticized compositions does not impair the valuable properties of the present esters. The present esters are of general utility in softening vinyl chloride polymers. They may be used as the only plasticizing component in a compounded vinyl chloride polymer or they may be used in conjunction with other plasticizers.

What I claim is:

Tris(tetrahydrofurfuryl) (1',2' - dicarboxyethyl)octadecenoate.

References Cited in the file of this patent

UNITED STATES PATENTS

| | | |
|---|---|---|
| 1,802,623 | Van Schaack | Apr. 28, 1931 |
| 2,167,420 | Humphrey | July 25, 1939 |
| 2,188,882 | Clocker | Jan. 30, 1940 |
| 2,188,887 | Clocker | Jan. 30, 1940 |
| 2,259,141 | Russell | Oct. 14, 1941 |
| 2,319,576 | Agens | May 18, 1943 |
| 2,325,948 | Garvey | Aug. 3, 1943 |
| 2,422,177 | Blair | June 17, 1947 |
| 2,510,915 | Spurlin | June 6, 1950 |
| 2,585,222 | Bruins | Feb. 12, 1952 |